(12) United States Patent
Lee et al.

(10) Patent No.: US 11,603,620 B2
(45) Date of Patent: Mar. 14, 2023

(54) WASHING MACHINE

(71) Applicant: LG ELECTRONICS INC., Seoul (KR)

(72) Inventors: Jeonguk Lee, Seoul (KR); Joonho Pyo, Seoul (KR); Taehee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/503,985

(22) Filed: Oct. 18, 2021

(65) Prior Publication Data

US 2022/0034018 A1 Feb. 3, 2022

Related U.S. Application Data

(63) Continuation of application No. 16/578,086, filed on Sep. 20, 2019, now Pat. No. 11,168,431.

(30) Foreign Application Priority Data

Sep. 21, 2018 (KR) .......................... 10-2018-0113471

(51) Int. Cl.
*D06F 37/40* (2006.01)
*D06F 23/04* (2006.01)
*F16D 11/14* (2006.01)
*F16D 27/09* (2006.01)
*H01F 7/08* (2006.01)
(Continued)

(52) U.S. Cl.
CPC .............. *D06F 37/40* (2013.01); *D06F 23/04* (2013.01); *F16D 11/14* (2013.01); *F16D 27/09* (2013.01); *H01F 7/081* (2013.01); *H01F 27/24* (2013.01); *H01F 27/325* (2013.01)

(58) Field of Classification Search
None
See application file for complete search history.

(56) References Cited

U.S. PATENT DOCUMENTS 3,740,975 A * 6/1973 Cornelius ............. D06F 37/145
68/148
2002/0166349 A1 11/2002 Lim et al.
(Continued)

FOREIGN PATENT DOCUMENTS

CN 1508344 A 6/2004
CN 202337895 U 7/2012
(Continued)

*Primary Examiner* — Cristi J Tate-Sims
(74) *Attorney, Agent, or Firm* — Birch, Stewart, Kolasch & Birch, LLP

(57) ABSTRACT

A washing machine includes a washing tub rotatably disposed to accommodate laundry, a pulsator rotatably disposed in the washing tub, a drive shaft to rotate the pulsator, a dehydration shaft to be connected to the washing tub and through which the drive shaft passes, a solenoid to form a magnetic field when a current is applied, a fixing core to surround the solenoid, and a clutch to couple and uncouple the drive shaft and the dehydration shaft. The clutch includes an armature to be lifted by a magnetic force of the solenoid, and a clutch coupler to be elevated along the dehydration shaft, perform coupling between the drive shaft and the dehydration shaft in a first position, and perform uncoupling between the drive shaft and the dehydration shaft in a second position lifted from the first position.

20 Claims, 16 Drawing Sheets

(51) Int. Cl.
*H01F 27/24* (2006.01)
*H01F 27/32* (2006.01)

(56) References Cited

U.S. PATENT DOCUMENTS

2003/0000263  A1    1/2003   Kim et al.
2008/0041114  A1*   2/2008   Dickerson ............... D06F 37/40
                                                           29/854
2012/0228079  A1    9/2012   Batt et al.

FOREIGN PATENT DOCUMENTS

KR    10-2002-0085192 A    11/2002
KR    10-2003-0023316 A     3/2003

\* cited by examiner (a)

(b)

(a)

(b)

WASHING MACHINE

CROSS REFERENCE TO RELATED APPLICATION

This application is a continuation of co-pending U.S. application Ser. No. 16/578,086, filed on Sep. 20, 2019, which claims the benefit under 35 U.S.C. § 119(a) to Patent Application No. 10-2018-0113471, filed in the Republic of Korea on Sep. 21, 2018, all of which are hereby expressly incorporated by reference into the present application.

BACKGROUND OF THE INVENTION

1. Field of the Invention

The present disclosure relates to a washing machine having a clutch operated by a solenoid.

2. Description of the Related Art

A washing machine that is provided with a clutch that is operated by a solenoid, and that selectively connects or disconnects a laundry shaft to a dehydration shaft, is well known. For example, Korean Patent Laid-Open Publication No. 2003-0023316 (hereinafter, referred to as "related art"), as shown in FIGS. 1 to 5, discloses a structure in which a slider 94 serration-coupled with a dehydration shaft 93 is separated from a driving container 92 formed in a rotor 91 of a washing motor while being lifted by the magnetic force of a solenoid 95.

In the state where power is not applied to the solenoid 95, the slider 94 is engaged with both the dehydration shaft 93 and the driving container 92, so that the rotational force of the rotor 91 is transmitted to the dehydration shaft 93 through the slider 94. At this time, the washing shaft 96 and the dehydration shaft 93 are rotated together.

On the contrary, when power is applied to the solenoid 95, the slider 94 is lifted up by the magnetic force of the solenoid 95 and separated from the driving container 92. Therefore, since the rotational force of the rotor 91 is no longer transmitted to the dehydration shaft 93, only the washing shaft 96 connected to the rotor 91 is rotated.

The solenoid 95 is disposed in a space surrounded by first and second yoke plates 97 and 98. At this time, in the second yoke plate 98, a flat portion 982 bent at the lower end of a cylindrical portion 981 surrounds the bottom surface of the solenoid 95.

In the slider 94, a movable yoke 94a of metallic material receives force upward due to the magnetic force of the solenoid 95. At this time, a coupling body 94b serration-coupled with the dehydration shaft 93 in the movable yoke 94a is raised along the dehydration shaft 93 together with the movable yoke 94a.

The movable yoke 94a is configured to include a cylindrical portion 941 disposed in an inner area of the solenoid 95, and a flange 943 that is extended from the lower end of the cylindrical portion 941, and has an unevenness portion 942 engaged with an unevenness formed in the driving container 92. When a current is applied to the solenoid 95 and the movable yoke 94a is lifted, the flange 943 collides with the flat portion 982 of the second yoke plate 98, which generates a noise.

In particular, when the movable yoke 94a is positioned in the uppermost extent, the magnetic force applied to the movable yoke 94a from the solenoid 95 reaches tens of times larger in comparison with a case where the movable yoke 94a is positioned in the lowermost extent. This is because as the movable yoke 94a is lifted and the flange 943 of the movable yoke 94a approaches the flat portion 982 of the second yoke plate 98, the magnetic resistance decreases rapidly, and to that extent, the magnetic force increases dramatically. For this reason, the noise is greatly generated because the movable yoke 94a is accelerated during lifting and collides with the flat portion 982 of the second yoke plate 98 at a high speed in the uppermost position.

In addition, since the flange 943 of the movable yoke 94a is far from the flat portion 982 of the second yoke plate 98 in the state where the movable yoke 94a is positioned at the lower position, the initial lifting speed of the movable yoke 94a is slow. However, since the electromagnetic force between the flange 943 and the flat portion 982 is inversely proportional to the square of the distance, the attractive force between the flange 943 and the flat portion 982 increases rapidly as the movable yoke 94a is gradually lifted. That is, in the related art, sufficient lifting force is not applied to the movable yoke 94a at the initial stage of the lifting of the movable yoke 94a that requires the accuracy of operation. On the contrary, at the maximum lift position, excessive lifting force is applied to generate noise and burnout of components due to impact with the second yoke plate 98.

SUMMARY OF THE INVENTION

The present disclosure has been made in view of the above problems, and provides a washing machine that has a clutch operated by a solenoid, and in particular, allows the magnetic force applied to the clutch to be uniform in the process of raising the clutch, in comparison with the related art.

The present disclosure further provides a washing machine that reduces the impact and noise when the clutch abuts with a fixing core in the process of raising the clutch.

The present disclosure further provides a washing machine in which sufficient lifting force is applied to the clutch at the initial stage of the raising of the clutch for connecting the drive shaft and the dehydration shaft together.

The present disclosure further provides a washing machine that can rapidly increase the lifting force applied to the clutch, when the clutch reaches a certain height.

The present disclosure further provides a washing machine which increases the magnetic flux contributing to the lift of the clutch by improving the magnetic path where the magnetic flux generated from the solenoid moves.

The present disclosure further provides a washing machine in which a separate fixing core added to construct the magnetic path is eliminated, by allowing a bearing housing for accommodating a bearing supporting the dehydration shaft to constitute a part of the magnetic path through which the magnetic flux generated from the solenoid passes.

The present disclosure further provides a washing machine in which a separate part used to install the conventional solenoid is eliminated, by disposing the solenoid in the bearing housing.

The present disclosure further provides a washing machine that can utilize the magnetic flux flowing from an armature to the dehydration shaft to lift the armature.

The washing machine of the present disclosure operates by a solenoid, and includes a clutch that performs a shaft-joint (or connection) or a shaft-joint release (or disconnection/separation) between the drive shaft and the dehydration shaft.

The drive shaft is an axis for rotating the pulsator. The drive shaft may be directly connected to the pulsator or connected by a planetary gear train.

The dehydration shaft is connected to the washing tub, and has a first hollow through which the drive shaft passes. At least a part of the dehydration shaft is formed of ferromagnetic material.

A fixing core surrounding the solenoid is provided. The clutch includes: an armature configured to be lifted by a magnetic force of the solenoid; and a clutch coupler configured to be elevated by the armature (or moved together with the armature).

The armature includes: a core base configured to be disposed below the fixing core, and extended outward from the clutch coupler; and a core outer portion configured to be extended upward from an outer circumference of the core base, extended outwards in a radial direction and upward, and extended further outward than the fixing core.

The clutch coupler is lifted along the dehydration shaft. The inner circumferential surface of the clutch coupler defines a second hollow through which the dehydration shaft passes, and that is spline-jointed to the outer circumferential surface of the dehydration shaft.

The clutch coupler performs a shaft-joint connection between the drive shaft and the dehydration shaft in a connection position, and performs a shaft-joint release between the drive shaft and the dehydration shaft in a disconnection position elevated from the connection position.

When the clutch is located in the connection position, the upper end of the core outer portion is closer to the fixing core than the core base, and the upper end of the inclined core is spaced apart from the fixing core.

The magnetic flux generated by the solenoid is moved along the fixing core, the core outer portion, the core base, and the dehydration shaft. A bearing for supporting the dehydration shaft in the upper side of the solenoid may be further included. In this case, a magnetic path passing through the fixing core, the core outer portion, the core base, the dehydration shaft, and the bearing is formed.

At least a part of the bearing is made of ferromagnetic material. A bearing housing for accommodating the bearing is provided, and the solenoid may be installed in the bearing housing.

The fixing core may constitute the bearing housing. The bearing housing may include a cylindrical portion (or a tubular portion) that extends in a vertical direction and surrounds the bearing and the solenoid, and the cylindrical portion may constitute the fixing core.

The core outer portion may be inclined at a certain acute angle with respect to the horizontal. The core outer portion may be in the form of a truncated cone having an upper end diameter larger than the lower end diameter. The lower end of the fixing core may be located in an area surrounded by the core outer portion in a state in which the armature is lifted in correspondence with the disconnection position.

An elastic member may be provided to apply the repulsive force to the clutch in a downward direction. The solenoid may include a bobbin having a hollow through which the dehydration shaft passes, and a coil wound around the bobbin.

The elastic member may be a coil spring disposed in the hollow in an outer insertion state to the dehydration shaft, and the coil spring may be disposed between the bearing and the clutch coupler.

A washing motor having a rotor connected to the drive shaft, and a rotor hub for connecting the rotor with the drive shaft, may be further provided. The clutch coupler may be engaged with the rotor hub in the connection position and may be separated from the rotor hub in the disconnection position.

A washing machine according to another aspect of the present disclosure includes an armature configured of a core base and a core outer portion. The core outer portion has a cylindrical form extended upward from the outer circumference of the core base.

The core outer portion includes a lower core outer portion configured to be extended upward from an outer circumference of the core base, an upper core outer portion configured to be positioned above the lower core outer portion and to have a lower end having a larger inner diameter than an inner diameter of the lower core outer portion, and a core connecting portion configured to form an angle with respect to vertical at an angle greater than an angle that the upper core outer portion forms with respect to vertical, and be extended to a lower end of the lower core outer portion from an upper end of the upper core outer portion.

The force acting between the fixing core and the lower core outer portion may reduce the force acting between the fixing core and the upper core outer portion according to the inner diameter difference of the upper core outer portion and the lower core outer portion.

A lower end of the fixing core is positioned in an area surrounded by the lower core outer portion, in a state where the armature is lifted in correspondence with the second position.

The lower core outer portion reaches from the core base to a first height, and the upper core outer portion has an inner diameter greater than the lower core outer portion at the first height. The core connecting portion may be extended horizontally.

The core base has an opening through which the dehydration shaft passes, and the armature may further include a core inner portion extended upward from a circumference of the opening.

The core inner portion may have a cylindrical shape surrounding the circumference of the dehydration shaft, and may extend from the core base to a height higher than the outer core portion.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE DISCLOSED EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
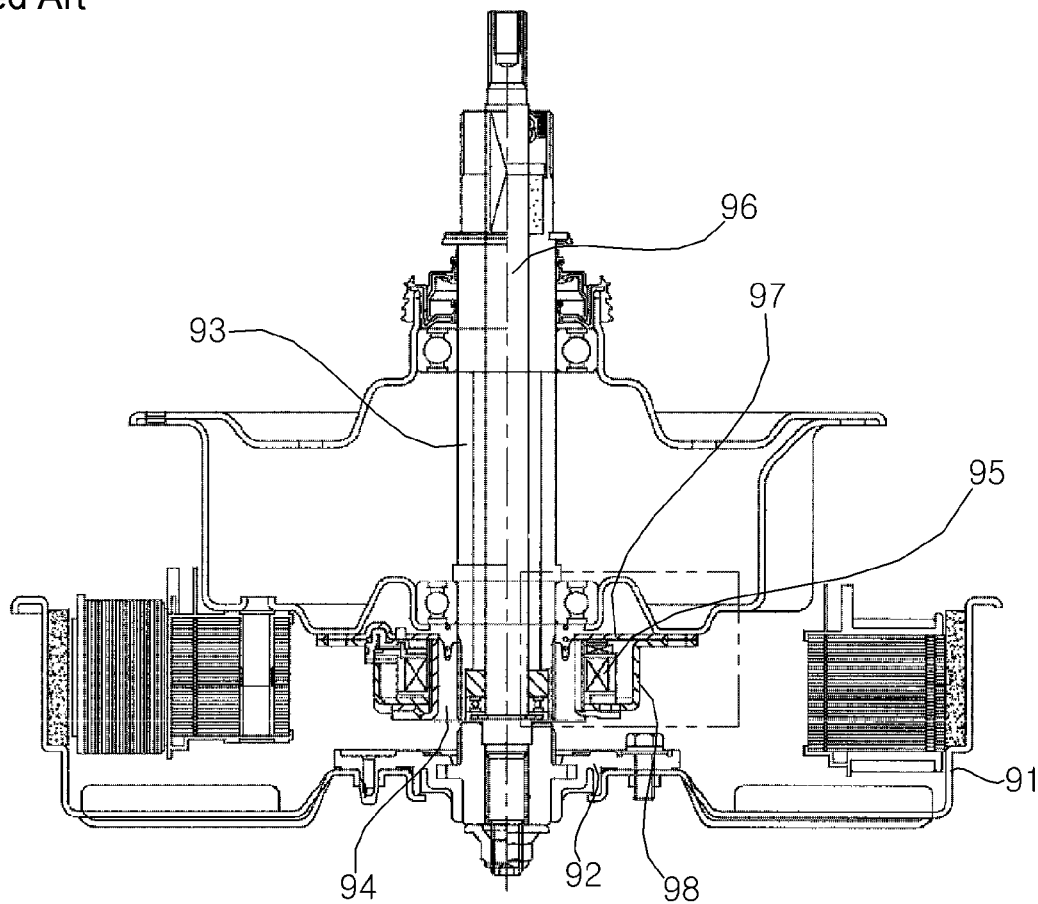
FIG. 1 shows a clutching system of a washing machine according to a related art.
Figure 2:
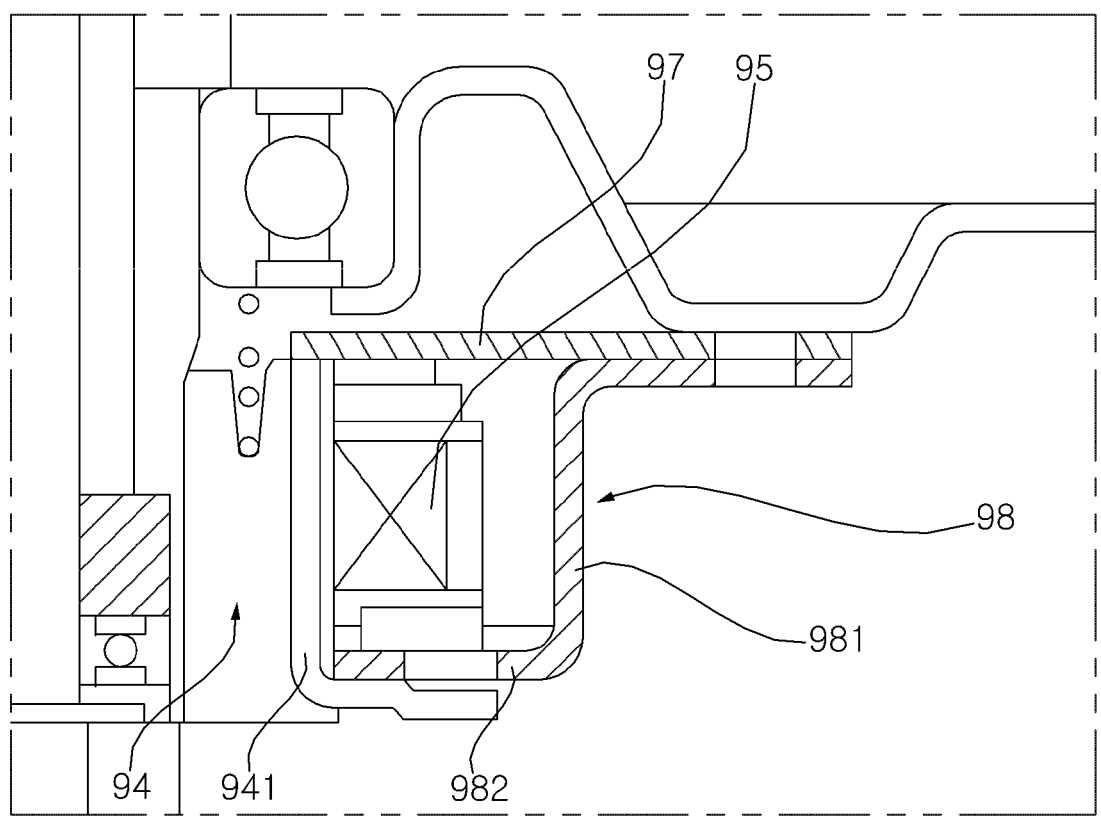
FIG. 2 is an enlarged view of a portion of FIG. 1.
Figure 3:
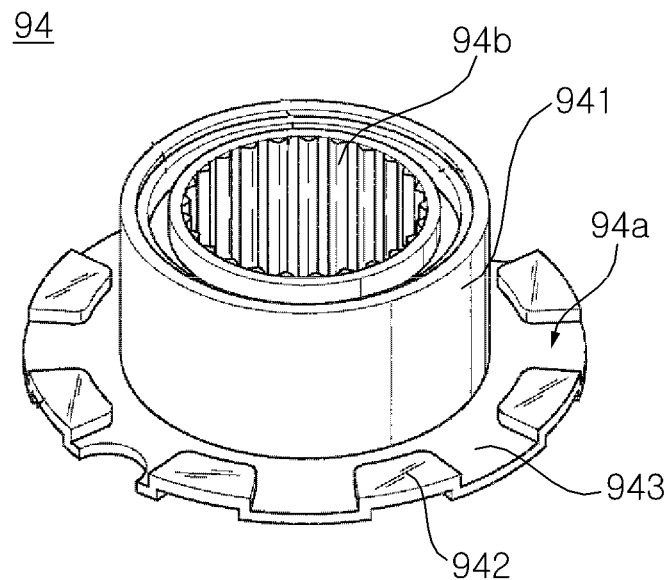
FIG. 3 shows a slider shown in FIG. 1.
Figure 4:
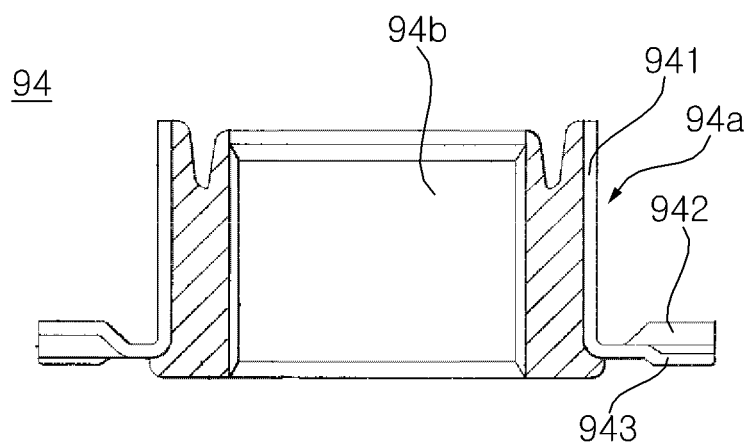
FIG. 4 shows a cross section of the slider shown in FIG. 3.
Figure 5:
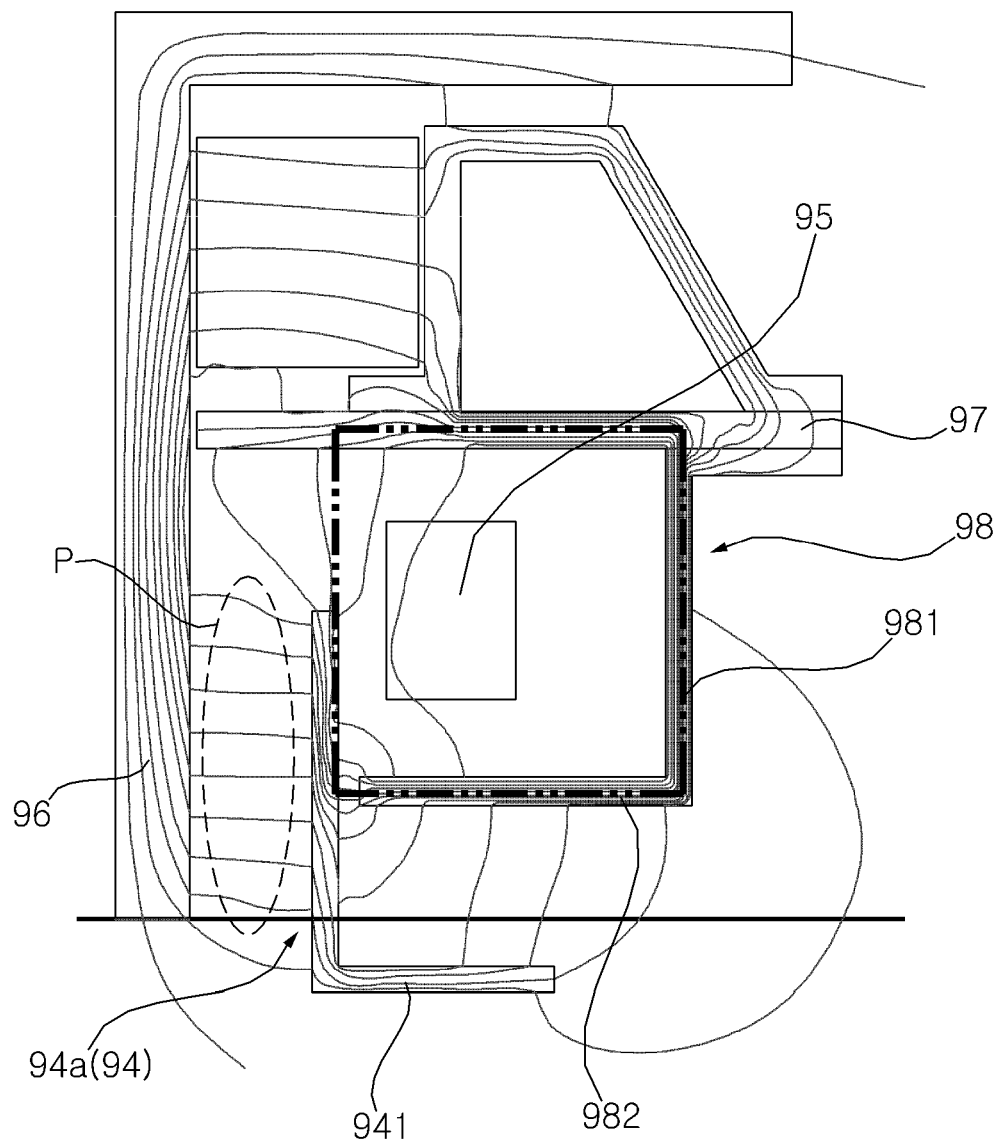
FIG. 5 shows a magnetic field in a portion shown in FIG. 2.
Figure 6:
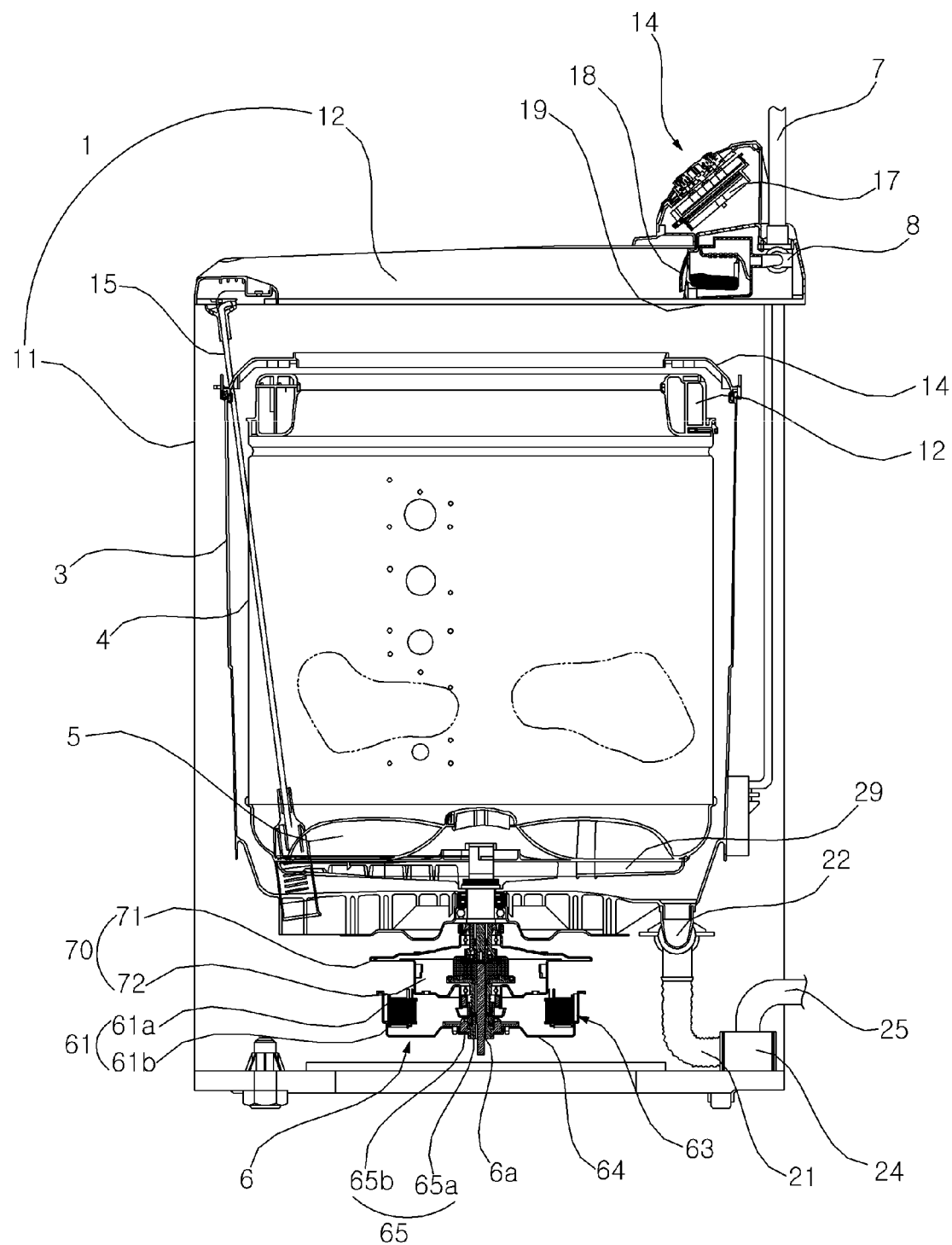
FIG. 6 shows a washing machine according to an embodiment of the present disclosure.
Figure 7:
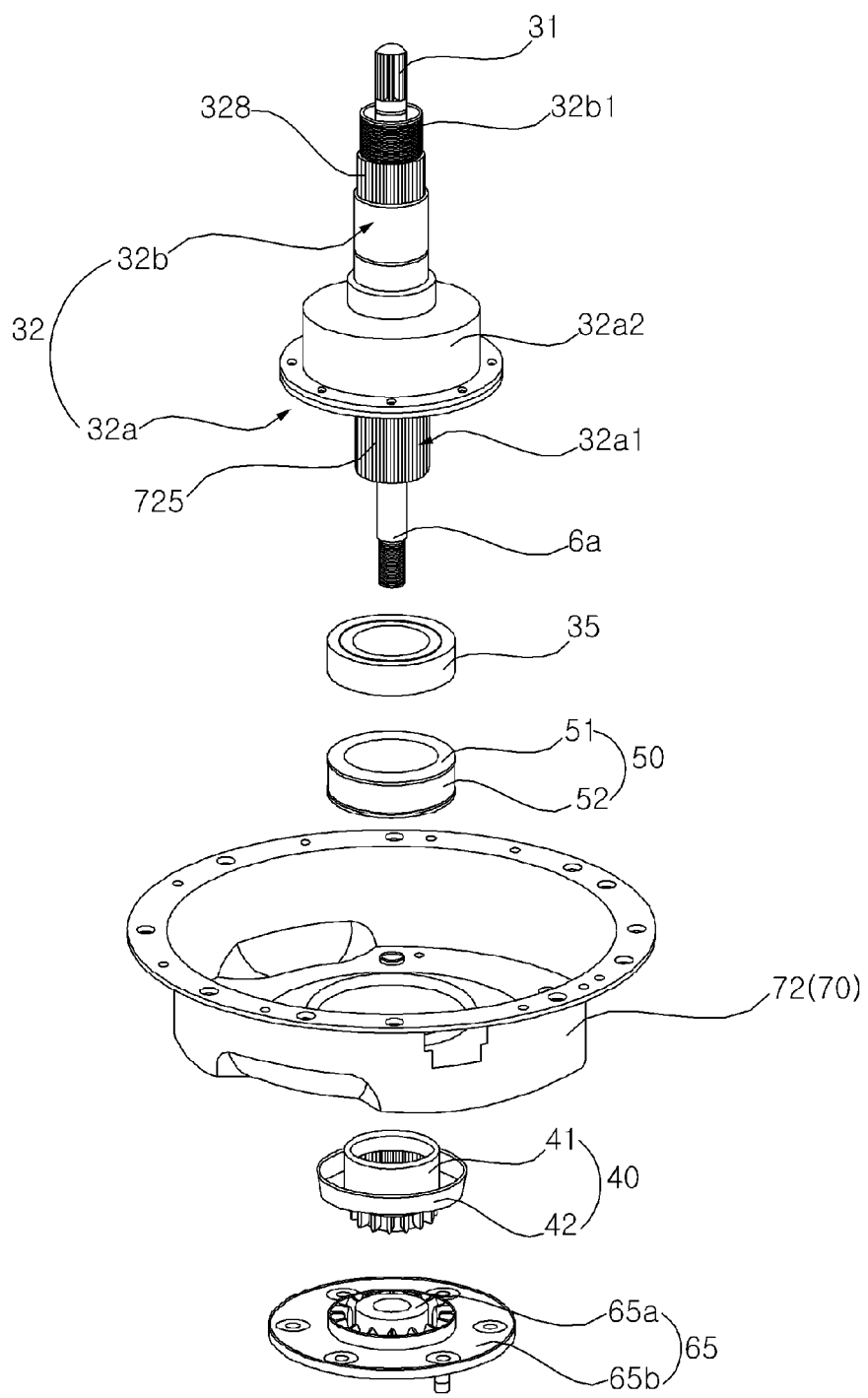
FIG. 7 is a partially exploded perspective view of a portion of the washing machine shown in FIG. 6.
Figure 8:
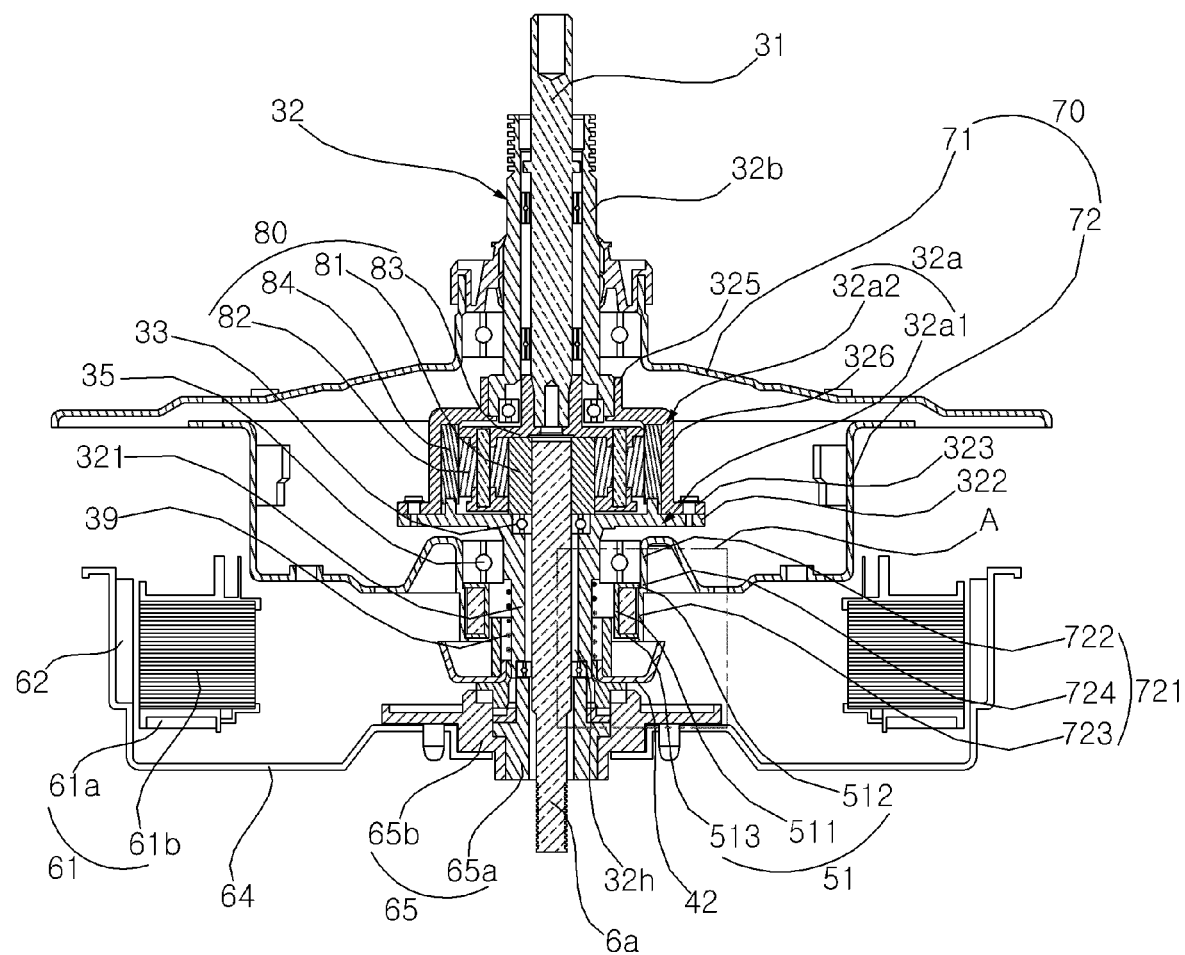
FIG. 8 is an enlarged view of a portion of the washing machine shown in FIG. 6.

Referring to FIGS. 6 to 8, a washing machine according to an embodiment of the present disclosure may include a casing 1 that forms an outer shape, and forms a space in which a water storage tank 3 (or outer tub) is accommodated. The casing 1 may include a cabinet 11 having an opened upper surface, a top cover 12 coupled to the opened upper surface of the cabinet 11, and a load port, through which laundry is introduced, formed in an approximately central portion thereof. The top cover 12 may be rotatably coupled to a door (not shown) for opening and closing the load port.

A suspension 15 which suspends the water storage tank 3 on the casing 1 may be provided. An upper end of the suspension 15 may be connected to the top cover 12, and the lower end of the suspension 15 may be connected to the water storage tank 3. The suspension 15 may be provided in each of four corners in the casing 1.

A control panel 14 may be provided in the top cover 12. The control panel 14 may include an input unit (e.g., a button, a dial, a touch pad, etc.) for receiving various control commands for controlling the operation of the washing machine from a user, and a display unit (e.g., LCD, LED display, etc.) for visually displaying the operating state of the washing machine.

A water supply pipe 7 for guiding water supplied from an external water source such as a faucet, and a water supply valve 8 for controlling the water supply pipe 7, may be provided. The water supply valve 8 may be controlled by a controller 17. The controller 17 may control not only the water supply valve 8 but also overall operation of the washing machine. The controller 17 may include a microprocessor having a memory for storing data. Hereinafter, unless otherwise stated, it will be understood that the control of the electrical/electronic components constituting the washing machine is performed by the controller 17.

A drawer 18 for containing the detergent may be housed in a drawer housing 19 to be movable in and out of the drawer housing 19. The water supplied through the water supply valve 8 is mixed with the detergent while passing through the drawer 18, and then discharged into the water storage tank 3 or a washing tub 4 (or inner tub) located within the water storage tank. A discharge pipe 21 for discharging the water from the water storage tank 3 and a drain valve 22 for controlling the discharge pipe 21 may be provided. The water discharged through the discharge pipe 21 may be pumped by a drain pump 24 and discharged to the outside of the washing machine through a drain pipe 25.

The washing tub 4 accommodates laundry and is rotated about a vertical axis in the water storage tank 3. A pulsator 5 is rotatably provided in the washing tub 4. The pulsator 5 is connected to a pulsator shaft 31.

A drive shaft 6a (or inner shaft) is implemented to rotate the pulsator 5 and is rotated by a washing motor 6. The drive shaft 6a is connected to a rotor 63 of the washing motor 6. A planetary gear train 80 may be provided that receives rotational force of the drive shaft 6a of the washing motor 6 and converts an output at a preset speed ratio or torque ratio to rotate the pulsator shaft 31.

The planetary gear train 80 rotates the pulsator shaft 31 by converting the torque inputted through the drive shaft 6a according to a set gear ratio. The gear ratio may be determined according to the number of teeth of a sun gear 81, a pinion gear 82, and a ring gear 84.

That is, in the embodiment, the drive shaft 6a is not directly connected to the pulsator 5, but is instead connected to the pulsator 5 by the planetary gear train 80 and the pulsator shaft 31. However, the present disclosure is not limited thereto and, in some embodiments, the planetary gear train 80 may not be used, and instead the drive shaft 6a of the washing motor 6 may be directly connected to the pulsator 5.

Referring to FIG. 8, the planetary gear train 80 is disposed in a gear housing 32a constituting the lower end of a dehydration shaft 32 (or outer shaft) described later. The gear housing 32a is coupled with an upper dehydration shaft 32b constituting the upper end portion of the dehydration shaft 32. More specifically, the dehydration shaft 32 is composed of an assembly of the gear housing 32a and the upper dehydration shaft 32b, and a first hollow 32h is formed to penetrate the assembly as a whole. A bearing 35 is configured to support the gear housing 32a.

However, in some embodiments, when the planetary gear train 80 is not provided, the gear housing 32a is also unnecessary. Therefore, in this case, the dehydration shaft 32 is composed of only the upper dehydration shaft 32b, which thus may be supported by the bearing 35.

The gear housing 32a may include a lower gear housing 32a1 and an upper gear housing 32a2. The lower gear housing 32a1 and the upper gear housing 32a2 are coupled to each other by a fastening member such as screw or bolt. The lower gear housing 32a1 is formed in a cylindrical shape as a whole and forms a hollow extending in the vertical direction, and the drive shaft 6a is inserted into the hollow.

The lower gear housing 32a1 may include a hollow shaft 321 that forms the first hollow 32h and a lower flange 322 that extends outward in the radial direction from the upper end of the hollow shaft 321. A bearing 33 for supporting the hollow shaft 321 and the drive shaft 6a to rotate relative to one another is interposed between the hollow shaft 321 and the drive shaft 6a.

The upper gear housing 32*a*2 is disposed above the lower gear housing 32*a*1. The upper gear housing 32*a*2 forms a certain accommodation space above the lower flange 322, and the planetary gear train 80 is disposed in the accommodation space. The accommodation space has a form of generally extending in the vertical direction, and the upper side and the lower side are open respectively.

The upper gear housing 32*a*2 is provided with a boss 325 coupled with the upper dehydration shaft 32*b*, and an upper side of the accommodation space is opened by the boss 325. The upper gear housing 32*a*2 may include a housing body 326 forming an inner circumferential surface surrounding the ring gear 84, and an upper flange 323 extends outwardly along the radial direction from an opened lower side of the housing body 326. The upper flange 323 is engaged with the lower flange 322, and the boss 325 extends upwardly from the housing body 326.

The sun gear 81 is connected to the drive shaft 6*a*, and rotates integrally with the drive shaft 6*a*. In the embodiment, the sun gear 81 is a helical gear, and correspondingly, the pinion gear 82 and the ring gear 84 are also configured to have teeth in the form of a helical gear, but are not necessarily limited thereto. For example, the sun gear 81 may be implemented by a spur gear, and the pinion gear 82 and the ring gear 84 may also have teeth in the form of a spur gear.

The ring gear 84 may be fixed in the housing body 326 (or with respect to the housing body 326). That is, the ring gear 84 is rotated integrally with the gear housing 32*a*. The ring gear 84 is provided with teeth formed on an inner circumferential surface defining a ring-shaped opening.

The pinion gear 82 is interposed between the sun gear 81 and the ring gear 84 to mesh with the sun gear 81 and the ring gear 84. A plurality of pinion gears 82 may be disposed along the circumference of the sun gear 81, and each pinion gear 82 is rotatably supported by a carrier 83. The pinion gear 82 may be formed of acetal resin (POM).

The carrier 83 is engaged with (shaft-joint) the pulsator shaft 31. The carrier 83 is a type of link that connects the pinion gear 82 and the pulsator shaft 31. That is, as the pinion gear 82 revolves around the sun gear 81, the carrier 83 is rotated, so that the pulsator shaft 31 is rotated along with the carrier 83.

The washing motor 6 may be a brushless direct current (BLDC) motor of an outer rotor type. Specifically, the washing motor 6 may include a stator 61 in which a stator coil 61*b* is wound around a stator core 61*a*, and a rotor 63 that is rotated by an electromagnetic force acting between the stator 61 and the rotor 63. The rotor 63 may include a rotor frame 64 that fixes a plurality of permanent magnets 62 spaced along the circumferential direction, and a rotor hub 65 that connects the center of the rotor frame 64 with the drive shaft 6*a*.

However, the type of washing motor 6 is not limited thereto. For example, the washing motor 6 may be an inner rotor type, and may be an AC motor such as an induction motor and a shaded pole motor and, furthermore, may be formed of other well-known various types of motor.

Figure 12:
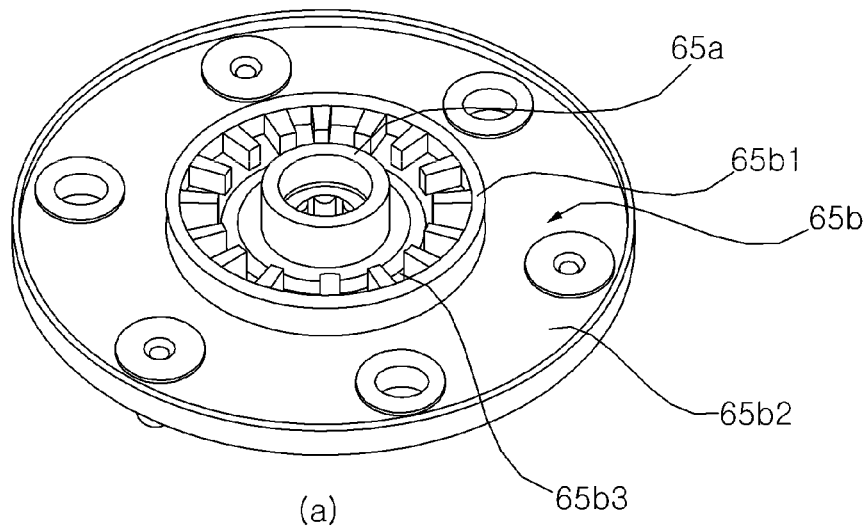
FIG. 12 is a perspective view (a) and a plan view (b) of a rotor hub shown in FIG. 8.
Figure 12:
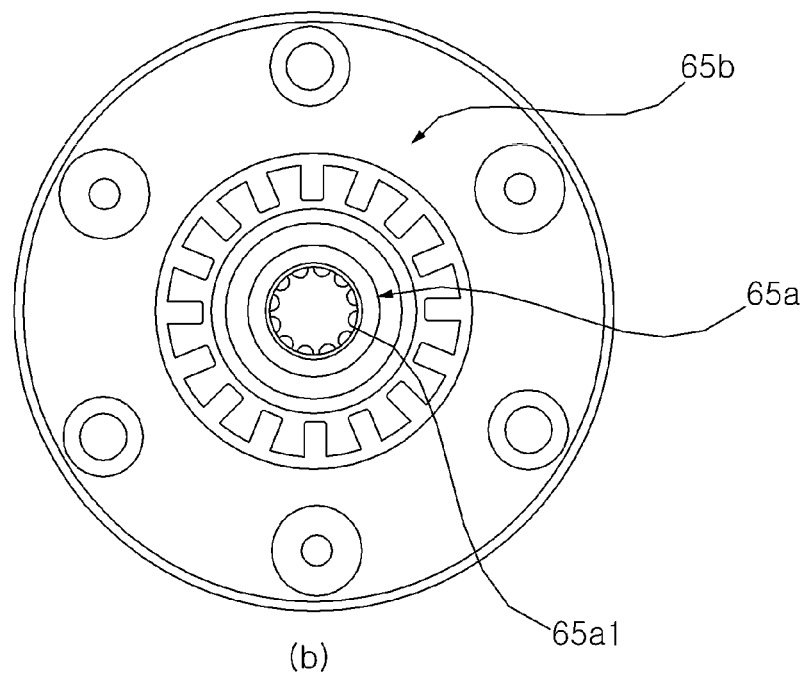

Referring to FIG. 12, the rotor hub 65 may include a rotor bush 65*a* coupled to the drive shaft 6*a*, and a coupling flange 65*b* coupling the rotor bush 65*a* to the center of the rotor frame 64. The coupling flange 65*b* may include a cylindrical flange body portion 65*b*1 into which the rotor bush 65*a* is inserted, and a flange portion 65*b*2 extended outward from the flange body portion 65*b*1 and coupled with the rotor frame 64 by a fastening member such as screw or bolt. In particular, engaging grooves 65*b*3 engaging with a clutch coupler 41 described later may be formed in the inner circumferential surface of the flange body portion 65*b*1.

The rotor bush 65*a* may be formed of a metal material (preferably, stainless steel, but not limited thereto). The rotor bush 65*a* is coupled to the drive shaft 6*a*. Preferably, the inner circumferential surface of the rotor bush 65*a* may be spline-jointed to the outer circumferential surface of the drive shaft 6*a*. In (b) of FIG. 12, 65*a*1 illustrates teeth formed in the inner circumferential surface of the rotor bush 65*a*.

The coupling flange 65*b* is formed of a synthetic resin material, and is interposed between the rotor bush 65*a* and the rotor frame 64 so as to perform insulation so that the magnetic flux is not transmitted from the rotor frame 64 to the rotor bush 65*a*.

The rotor bush 65*a* and the coupling flange 65*b* can be integrally formed, by injecting a synthetic resin to form the coupling flange 65*b* while inserting the rotor bush 65*a* into a mold.

The dehydration shaft 32 is connected to the washing tub 4, and the first hollow 32*h* through which the pulsator shaft 31 passes is formed inside. The dehydration shaft 32 may be formed of a ferromagnetic agent. The dehydration shaft 32 may be connected to the washing tub 4 by a hub base 29 (see FIG. 6). The hub base 29 is coupled to the lower end of the washing tub 4, and a fastener through which the dehydration shaft 32 passes is formed in the center of the hub base 29. The dehydration shaft 32 is spline-jointed to the inner circumferential surface of the fastener, so that the hub base 29 is rotated together when the dehydration shaft 32 is rotated. The upper end 32*b*1 (see FIG. 7) of the dehydration shaft 32, having passed through the hub base 29, may be secured to the hub base 29 by a nut that fastens the dehydration shaft 32 to the hub base 29.

Here, a spline-coupling means that a spline 328 such as a tooth or a key extended axially is formed in one of the dehydration shaft 32 or the hub base 29, and a groove engaged with the spline is formed in the other, so that the spline and the groove are engaged with each other. The hub base 29 is also rotated together with the dehydration shaft 32 when the dehydration shaft 32 is rotated by such an engagement. When the cross section of the tooth constituting the spline is triangular, this may be separately referred to as a serration.

Referring to FIG. 8, the bearing 35 supporting the dehydration shaft 32 is provided in a bearing housing 70. At least a part of the bearing 35 may be formed of ferromagnetic material. The bearing 35 may be a rolling bearing. In this case, the bearing 35 may include an inner ring 35*a* coupled with the dehydration shaft, an outer ring 35*b* which is a non-rotating fixture coupled with the bearing housing 70, and a rolling element 35*c* (e.g., a ball or roller) which is held by a retainer (not shown) between the inner ring 35*a* and the outer ring 35*b* to support the inner ring 35*a* to be rotated with respect to the outer ring 35*b*. At least one of the inner ring 35*a*, the outer ring 35*b*, the rolling element 35*c*, and the retainer may be formed of a ferromagnetic material.

The bearing housing 70 may be coupled to the bottom surface of the water storage tank 3. The bearing housing 70 may be formed of ferromagnetic material. The bearing housing 70 may include an upper bearing housing 71 coupled to the bottom surface of the water storage tank 3, and a lower bearing housing 72 that is coupled to the upper bearing housing 71 in the lower side of the upper bearing housing 71, and defines a space in which the bearing 35 is accommodated between the upper bearing housing 71 and the lower bearing housing 72.

Figure 13:
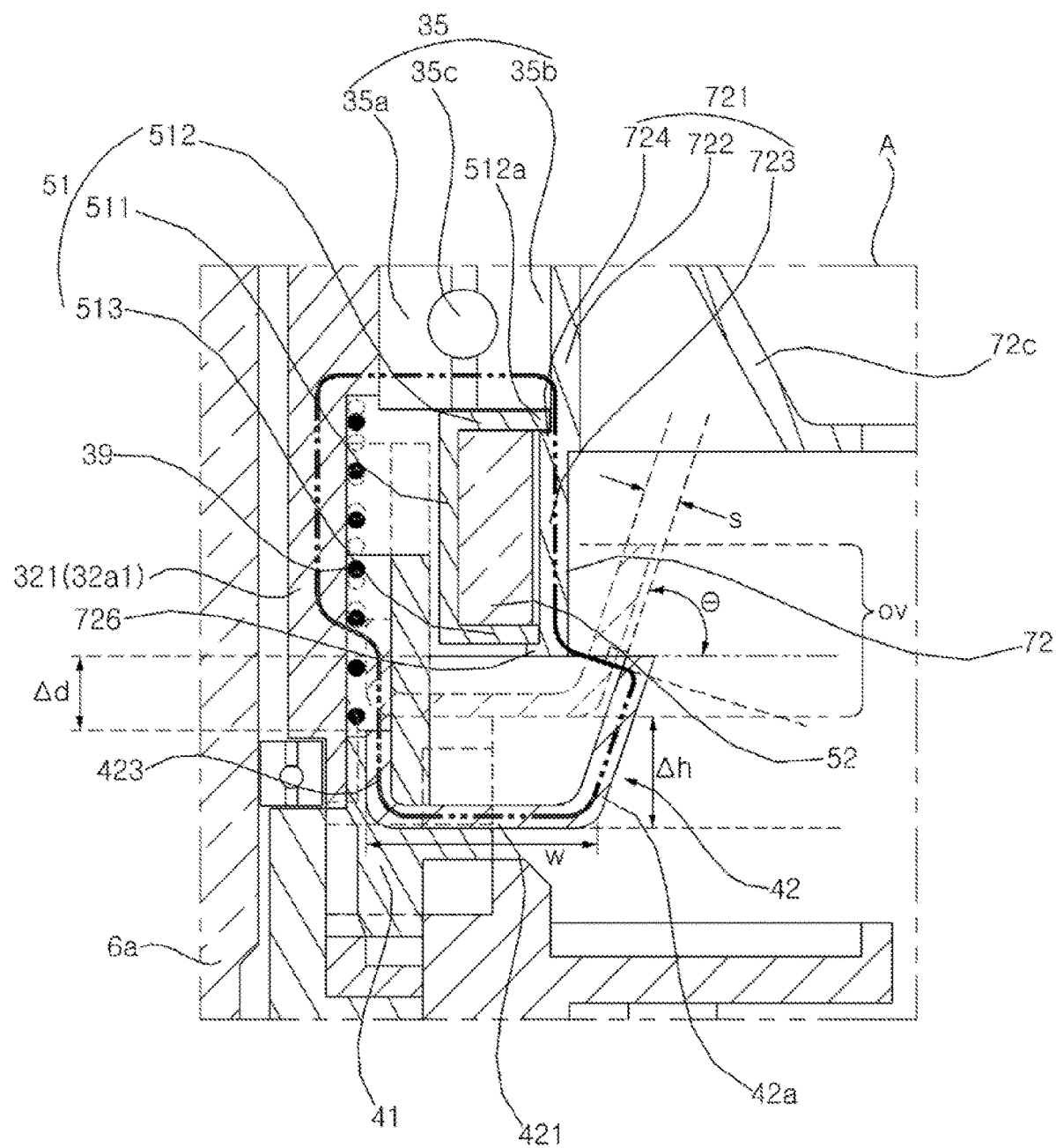
FIG. 13 is an enlarged view of a portion indicated by A in FIG. 8.
Figure 14:
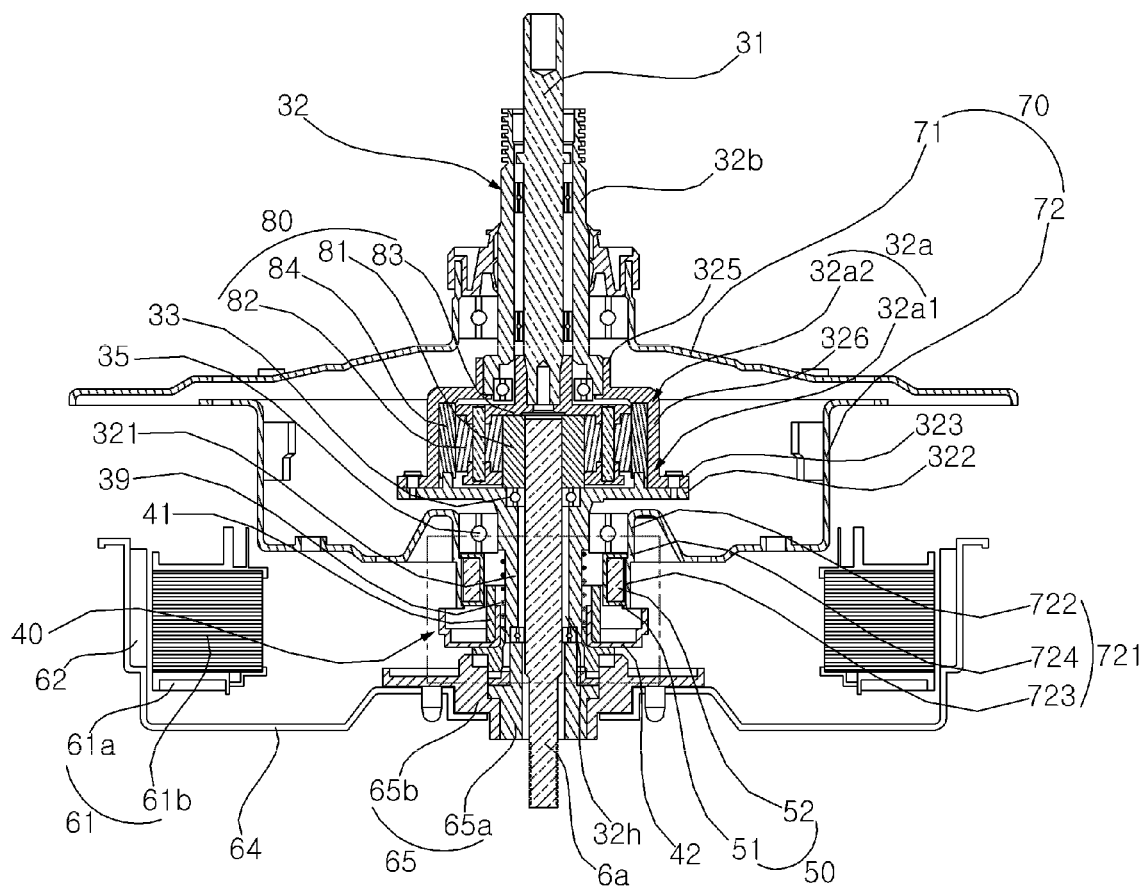
FIG. 14 is a partial view of a washing machine according to another embodiment of the present disclosure.
Figure 15:
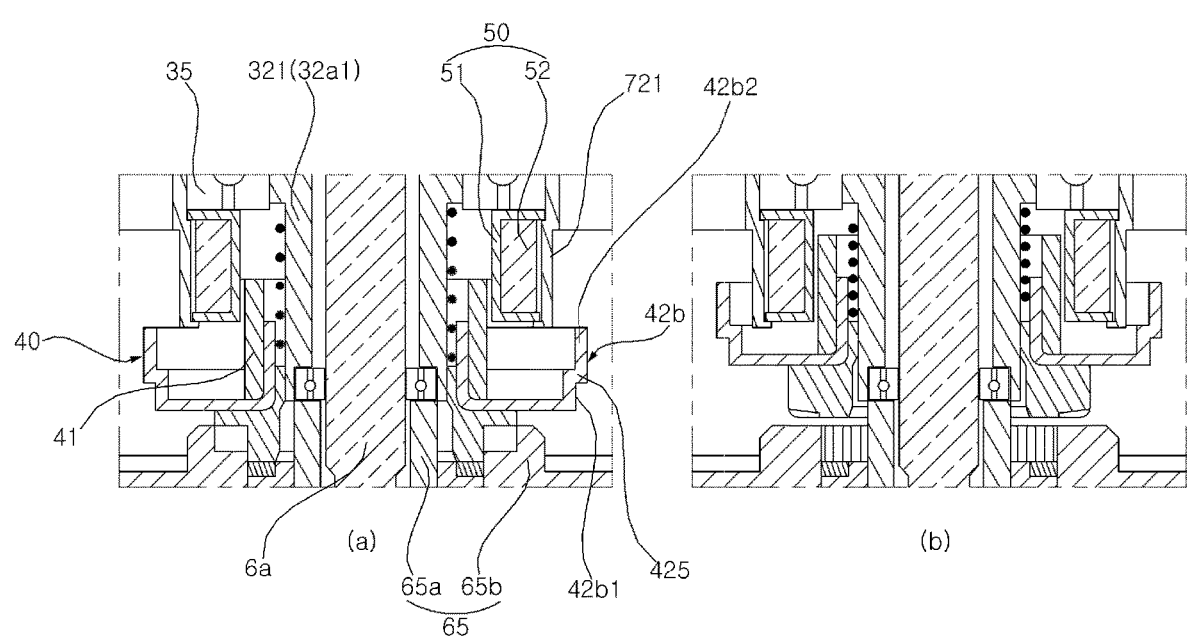
FIG. 15 shows a state (a) in which a clutch is in a connected position, and a state (b) in which the clutch is lifted from the connected position and separated from a rotor hub, in the washing machine shown in FIG. 14.

Referring to FIGS. 8 and 13, a solenoid 50 is provided that forms a magnetic field when a current is applied. The solenoid 50 may be disposed in the bearing housing 70. The solenoid 50 has a coil 52 wound about the dehydration shaft 32. Specifically, the solenoid 50 may include a bobbin 51 and a coil 52 wound around the bobbin 51. The bobbin 51 is provided with a hollow through which the dehydration shaft 32 passes, and the coil 52 is wound around the outer circumference of the bobbin 51.

The coil 52 may be wrapped with a resin of a flame retardant material. The bobbin 51 may include a cylindrical bobbin body portion 511 around which the coil 52 is wound, an upper plate portion 512 extended outward from an upper end of the bobbin body portion 511, and a lower plate portion 513 extended outward from a lower end of the bobbin body portion 511. The lower plate portion 513 of the bobbin 51 may be supported by a portion 726 (see FIG. 13) protruding radially inward from the lower end of a second fixing core 723.

A fixing core (magnetic core) 721 surrounding the solenoid 50 is provided. The fixing core 721 forms a magnetic path through which the magnetic field generated by the solenoid 50 passes. The fixing core 721 may be formed by part of the bearing housing 70.

The bearing housing 70 may include a cylindrical first fixing core 722 surrounding an outer circumference of the bearing 35, and a cylindrical second fixing core 723 that is extended downward from the first fixing core 722 and surrounds the outer circumference of the solenoid 50.

In detail, the lower bearing housing 72 includes a cylindrical (or tubular) portion forming the fixing core 721 that wraps around the dehydration shaft 32 and is extended in the vertical direction, and such a cylindrical portion forming the fixing core 721 includes the first fixing core 722 and the second fixing core 723 that form the magnetic path.

However, the present disclosure is not limited thereto, and it is also possible to configure the fixing core as a separate component from the bearing housing 70.

Figure 10:
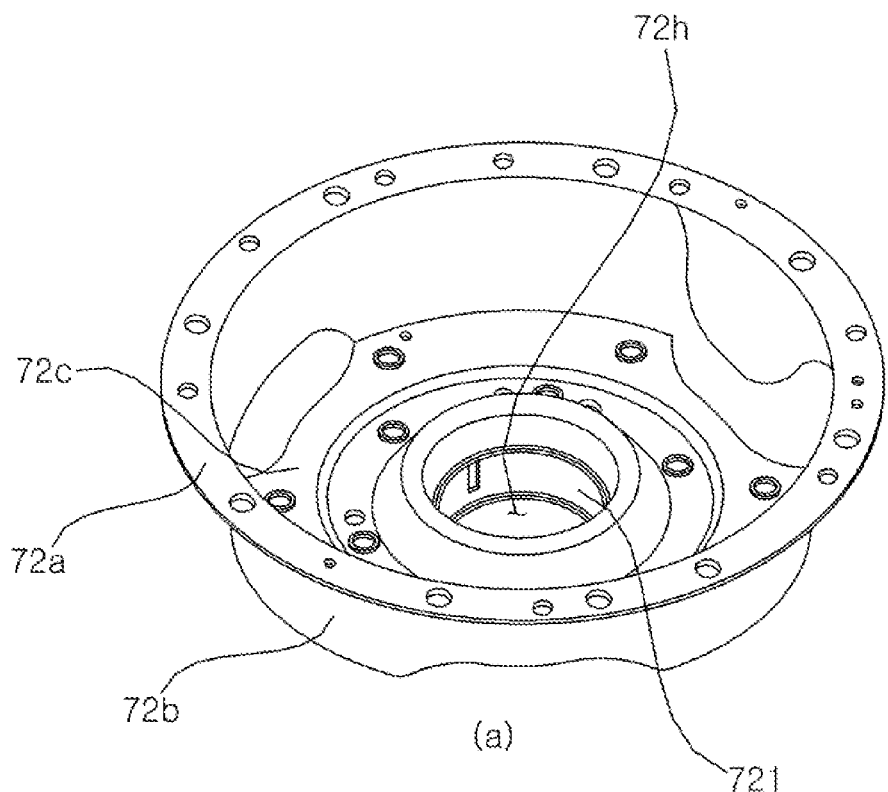
FIG. 10 is a perspective view (a) and a side view (b) of a lower bearing housing shown in FIG. 8.
Figure 10:
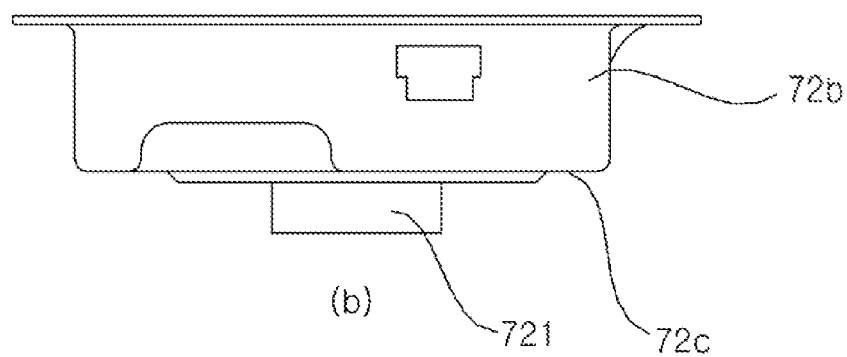

Referring to FIG. 10, the lower bearing housing 72 may include a ring-shaped coupling flange portion 72a coupled to the upper bearing housing 71 by a fastening member such as a screw or bolt, and a cylindrical housing side portion 72b extended downward from the inner diameter portion of the coupling flange portion 72a.

The lower bearing housing 72 may further include a housing lower plate portion 72c extended radially inward from a lower end of the housing side portion 72b. The dehydration shaft 32 passes through the housing lower plate portion 72c. The first fixing core 722 may extend downwardly from the housing lower plate portion 72c. Preferably, the first fixing core 722 extends downwardly from around an opening through which the dehydration shaft 32 passes.

An opening 72h, through which the dehydration shaft 32 passes, may be formed in the lower bearing housing 72 below the second fixing core 723. The opening 72h is defined by the portion 726 protruding radially inward from the lower end of the lower end of a second fixing core 723. In this case, the opening 72h may have a larger diameter than the hollow (hollow through which the dehydration shaft 32 passes) formed in the bobbin 51.

Meanwhile, the second fixing core 723 may have a smaller inner diameter than the first fixing core 722. In addition, the upper plate portion 512 of the bobbin 51 is protruded outward in the radial direction more than the coil 52, so that such a protruding portion 512a may be supported by a horizontal portion located between the first fixing core 722 and the second fixing core 723. More specifically, on the inner side surface of the cylindrical portion forming the fixing core 721, a surface 724 extends substantially horizontally from the lower end of the first fixing core 722 to the upper end of the second fixing core 723 due to an inner diameter difference between the first fixing core 722 and the second fixing core 723.

The clutch 40 which performs a shaft-joint (or connection) or a shaft-joint release (or disconnection) between the drive shaft 6a and the dehydration shaft 32 is provided. The clutch 40 is provided to be lifted along the dehydration shaft 32 from the lower side of the solenoid 50. The clutch 40 performs a shaft-joint between the drive shaft 6a and the dehydration shaft 32 at a connection position, and performs a shaft-joint release between the drive shaft 6a and the dehydration shaft 32 at a disconnection position by being lifted from the connection position by the magnetic force of the solenoid 50.

The clutch 40 is disposed below the solenoid 50 as a whole, but the armature 42 (or plunger), or a movable core forming a magnetic path of the flux formed by the solenoid 50, may partially reach the inside of the solenoid 50. The armature 42 may be formed of ferromagnetic material.

Figure 11:
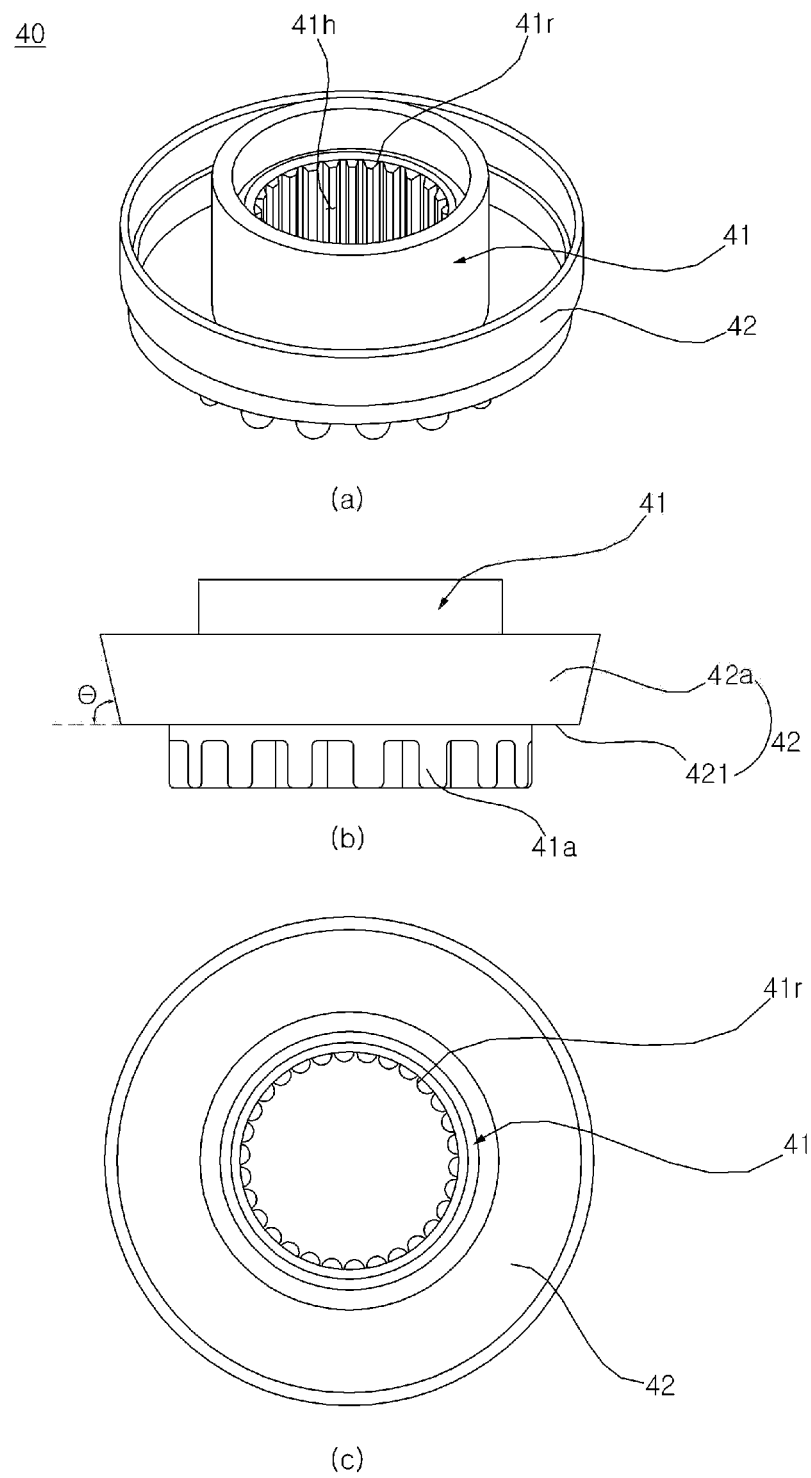
FIG. 11 is a perspective view (a), a side view (b), and a plan view (c) of a clutch shown in FIG. 8.

Referring to FIG. 11, the clutch 40 further includes a clutch coupler 41 that is moved by the armature 42. The clutch coupler 41 is formed in a cylindrical shape as a whole to form a second hollow 41h into which the dehydration shaft 32 is inserted. The clutch coupler 41 may be formed of a synthetic resin material, but is not necessarily limited thereto, and may be formed of a metal (e.g., ferromagnetic material).

Since the inner circumferential surface defining the second hollow 41h is spline-jointed to the outer circumferential surface of the dehydration shaft 32, the clutch coupler 41 may move in the axial direction (i.e., the longitudinal direction of the dehydration shaft 32) in the state where the clutch rotation with respect to the dehydration shaft 32 is restrained. The inner circumferential surface may be provided with an engaging groove 41r that meshes (or engages) with teeth 725 (see FIG. 7) formed in the outer circumferential surface of the dehydration shaft 32.

Figure 9:
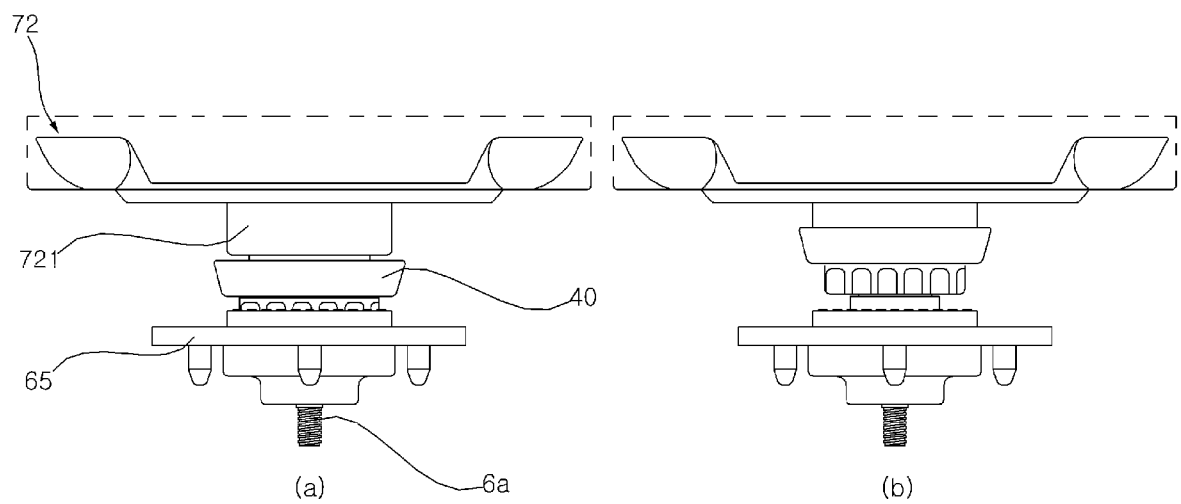
FIG. 9 shows a state (a) in which a clutch is in a connected position, and shows a state (b) in which the clutch is in a disconnected position.

The clutch coupler 41 performs a shaft-joint (connection) between the drive shaft 6a and the dehydration shaft 32 at a first position corresponding to the connection position (see FIG. 9A), and performs a shaft-joint release (disconnection) between the drive shaft 6a and the dehydration shaft 32 at a second position corresponding to the disconnection position (see FIG. 9B).

Referring to FIGS. 11 and 12, teeth 41a may be formed at the lower end of the clutch coupler 41, so that when the clutch coupler 41 is located in the first position, the teeth 41a engage with the engaging groove 65b3 of the coupling flange 65b.

Lifting of the clutch coupler 41 along the dehydration shaft 32 is performed by the armature 42. That is, the lifting of the clutch coupler 41 is achieved by the lifting force applied to the armature 42 which is lifted by the electromagnetic interaction with the solenoid 50.

The clutch coupler 41 may be coupled to the armature 42, and may be integrally lifted with the armature 42. The clutch coupler 41 may be formed by injecting the synthetic resin in the state where the armature 42 is inserted into the mold, so that the clutch coupler 41 and the armature 42 can be integrally formed.

Referring to FIG. 13, an elastic member 39 may be provided for pushing the clutch 40 downward. In this case, in order for the clutch 40 to be lifted when a current is applied to the solenoid 50, the lifting force acting on the clutch 40 due to the magnetic field must be greater than a descending force applied by the elastic member 39 to the clutch 40.

The elastic member 39 may be a coil spring. The elastic member 39 may be disposed inside the bobbin 51, and may be interposed between the bearing 35 and the clutch coupler 41. The upper end of the elastic member 39 may contact the bearing 35 or an area adjacent to the bearing 35, and the lower end may contact the clutch coupler 41.

The armature 42 may include a core base 421 disposed below the fixing core 721 and extended outward from the clutch coupler 41, and a core outer portion 42a (see FIGS. 11 and 13) extended upward from the outer circumference of the core base 421. The core outer portion 42a is gradually extended outward along the radial direction as it progresses upward, and is extended further outward than the fixing core 721.

The core outer portion 42a has a truncated cone shape where a diameter is minimized at the lower end portion connected to the core base 421 and the diameter is maximized at the upper end, and an angle θ of the core outer portion 42a with respect to the horizontal is an acute angle.

As shown in FIG. 13, when the height of the armature 42 is increased by Δh, the distance s between the lower end of the fixing core 721 and the core outer portion 42a is reduced. In particular, since the magnetic flux flowing between the fixing core 721 and the core base 421 is applied mainly between the lower end of the fixing core 721 and the core base 421, i.e., between the line and the surface, the strength of the magnetic force is weak in comparison with the case of acting between the planes as in the conventional case. Accordingly, even if the height of the armature is lifted, the effect of the magnetic force acting between the fixing core 721 and the core base 421 with respect to the lifting force is limited in comparison with the overall lifting force.

On the other hand, between the fixing core 721 and the core outer portion 42a, the magnetic force is applied between the planes. Therefore, the armature 42 is lifted to increase an area where the core outer portion 42a and the fixing core 721 are overlapped in the horizontal direction, so that the magnetic force acting between the fixing core 721 and the core outer portion 42a also increases. However, even in this case, since the core outer portion 42a is inclined, the area where the magnetic flux is perpendicular to the core outer portion 42a becomes an area which is acquired by orthogonally projecting the core outer portion 42a to the fixing core 721 when viewed from the side direction. Here, A is an area of a part OV which overlapped with the fixing core 721 among the inner side surface of the core outer portion 42a, when viewed from the side direction.

Therefore, in comparison with the case where the core outer portion 42a is orthogonal (i.e., the core outer portion 42a and the fixing core 721 are parallel to each other) to the horizontal (or to a virtual surface orthogonal to the dehydration axis 32), the ratio of the increase in an area which is acquired by orthogonally projecting the fixing core 721 to the core outer portion 42a with respect to the height increase of the armature 42 can be reduced. Therefore, the acceleration in the vertical direction of the armature 42 can be reduced, and a collision speed with the fixing core 721 can be reduced.

In addition, since the collision between the armature 42 and the fixing core 721 is achieved between the plane forming the armature 42 and the line formed by the lower end of the fixing core 721, less noise is generated in comparison with the case where the planes collide as in the related art.

Meanwhile, an opening through which the dehydration shaft 32 passes is formed in the core base 421, and a core inner portion 423 may extend upward from the circumference of the opening. The core inner portion 423 may be inserted (or embedded) in the mold.

The core inner portion 423 extends upward from the core base 421. The core inner portion 423 may extend from the core base 421 to a position lower than the core outer portion 42a. In this case, since the core inner portion 423 is further away from the lower end of the fixing core 721 or the bearing 35 as much as the height difference Δd with the core outer portion 42a, in the state where the armature 42 is lowered, the magnetic flux leaking from the core inner portion 423 to the fixing core 721 or the bearing 35 can be reduced.

When a current is applied to the solenoid 50, the magnetic flux in the lower end of the fixing core 721 forms a magnetic path mainly between the upper end of the core outer portion 42a and the lower end of the fixing core 721. In addition, the core inner portion 423 is spaced apart from the core outer portion 42a in the horizontal direction by a distance corresponding to the width w of the core base 421, so that it is relatively close to the dehydration shaft 32 in comparison with the core outer portion 42a. Therefore, the magnetic flux in the core inner portion 423 forms a magnetic path mainly between the dehydration shaft 32 and the core inner portion 423.

In particular, since the core inner portion 423 extends substantially in parallel with the dehydration shaft 32 to form a cylindrical shape that surrounds the outer side of the dehydration shaft 32, the planes of the core inner portion 423 and the dehydration shaft 32 face to each other. Therefore, the magnetic flux flows smoothly from the core inner portion 423 to the dehydration shaft 32.

In particular, as shown in FIGS. 8 and 13, since a closed magnetic path (portion indicated by a two-point chain line in FIG. 13) is formed extending into the bearing 35, the fixing core 721, the armature 42, and the dehydration shaft 32, there is almost no magnetic flux leakage. Thus, substantially all of the magnetic flux flowing along the magnetic path contributes to the lifting of the armature 42.

In other words, since the core outer portion 42a of the armature 42 is adjacent to the fixing core 721, and the core inner portion 423 of the armature 42 is adjacent to the dehydration shaft 32, the magnetic flux flowing from the solenoid 50 to the bearing housing 70 passes out of the fixing core 721 and passes through air, and then is absorbed by the core outer portion 42a of the armature 42.

When the armature 42 is in a position lowered in correspondence with the connection position of the clutch 40 (i.e., the position of the armature 42 when the clutch 40 is in the connection position), the upper end of the core outer portion 42a may be located below the lower end of the fixing core 721. In this case, the magnetic flux flows mainly between the lower end of the core outer portion 42a and the upper end of the fixing core 721.

Meanwhile, the magnetic flux absorbed by the core outer portion 42a of the armature 42 flows again along the core base 421 to the core inner portion 423, and passes through the clutch coupler 41 from the core inner portion 423 and then is absorbed by the dehydration shaft 32. Then, the magnetic flux flowing along the dehydration shaft 32 passes through the bearing 35 and is absorbed by the first fixing core 722 forming a bearing mount portion. For reference, the two-point chain line shown in FIG. 13 shows the path of the magnetic flux.

As described above, in the washing machine according to the embodiment of the present disclosure, a magnetic path connecting the bearing 35, the bearing housing 70, the armature 42, and the dehydration shaft 32 is configured. In particular, in the magnetic path, there exists an air layer between the cylindrical portion forming the fixing core 721 of the bearing housing 70 and the core outer portion 42*a* of the armature 42, and the core inner portion 423 of the armature 42, and there exists a clutch coupler 41 of a non-ferromagnetic material (e.g., an injection of synthetic resin) between the core inner portion 423 of the armature 42 and the dehydration shaft 32. However, the magnetic path has a closed curve shape as a whole. Since the magnetic flux generated from the solenoid 50 flows along the closed curve-shaped magnetic path, leakage of the magnetic flux can be reduced in comparison with the related art, so that the lifting force of the clutch coupler 41 can be increased.

Figure 16:
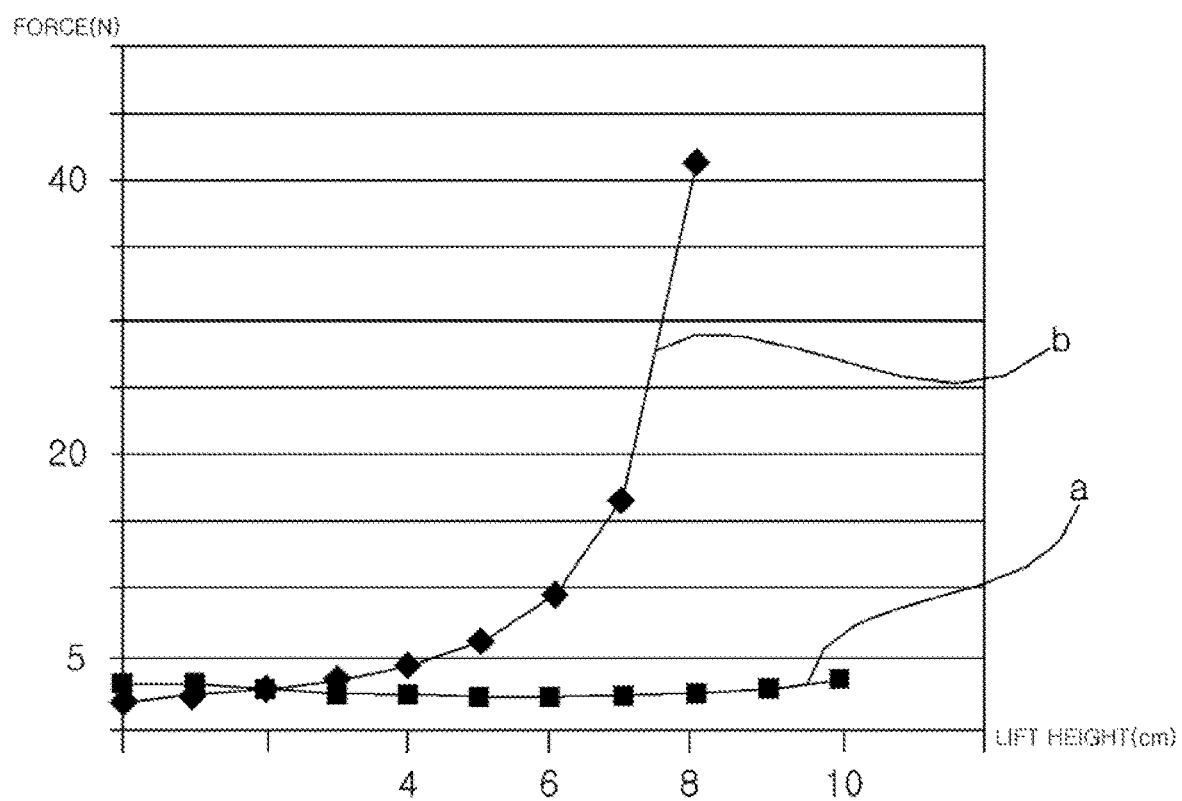
FIG. 16 is a graph showing a lifting force (a) according to a lift height of a clutch in the washing machine shown in FIG. 6 in comparison with the related art (b)

Meanwhile, according to an experiment, in the washing machine according to an embodiment of the present disclosure, as the lift height of the clutch 40 changes, as shown in FIG. 16, the force applied to the clutch 40 from the solenoid 50 is generally uniform in comparison with the related art. In particular, the present disclosure differs from the related art (see FIGS. 1 to 5) in that the armature 42 further includes a core outer portion 42*a*. This difference makes a relatively even change in lifting force (i.e., lifting force applied to the clutch 40 from the solenoid 50) in comparison with the related art in all positions in which the clutch 40 is lifted as shown in graph (a) of FIG. 16. Furthermore, in the present embodiment, since the inclined core outer portion 42*a* is used, during the lifting of the clutch 40, the lifting force applied from the solenoid 50 to the clutch 40 can be managed within a more even range.

The washing machine according to another embodiment of the present disclosure has a difference only in the armature 42 as compared to the above-described embodiment, but other configurations are substantially the same as the above-described embodiment. Hereinafter, in order to avoid duplication of description, the same reference numeral is given to the same configuration described above, and the description thereof will be omitted since it follows the above description.

The armature 42 may include a core base 421 disposed below a fixing core 721 and extended outward from the clutch coupler 41, and a cylindrical core outer portion 42*b* extended upward from the outer circumference of the core base 421.

The core outer portion 42*b* includes a lower core outer portion 42*b*1, an upper core outer portion 42*b*2, and a core connecting portion 425. The lower core outer portion 42*b*1 extends upward from the outer circumference of the core base 421. The upper core outer portion 42*b*2 is positioned above the lower core outer portion 42*b*1, and a lower end thereof has an inner diameter larger than the lower core outer portion 42*b*1.

The upper end of the lower core outer portion 42*b*1 and the lower end of the upper core outer portion 42*b*2 are connected by the core connecting portion 425. The core connecting portion 425 forms an angle with respect to the vertical at an angle greater than the angle that the upper core outer portion 42*b*2 forms with respect to the vertical (or the direction parallel to the dehydration axis 32), and is extended to the upper end of the lower core outer portion 42*b*1 from the lower end of the upper core outer portion 42*b*2.

Preferably, as in the embodiment, the upper core outer portion 42*b*2 is parallel to the vertical, and the core connecting portion 425 is extended horizontally (i.e., the core connecting portion 425 forms 90 degrees with respect to vertical). That is, the lower core outer portion 42*b*1 reaches from the core base 421 to a first height, and the upper core outer portion 42*b*2 may have a larger inner diameter than the lower core outer portion 42*b*1 at the first height. However, the present disclosure is not limited thereto, and the core connecting portion 425 may have an acute angle with the vertical.

Furthermore, when the upper core outer portion 42*b*2 forms a first angle that is an acute angle with respect to the vertical, the core connecting portion 425 may be inclined with respect to the vertical at a second angle greater than the first angle.

Since there is an inner diameter difference between the lower end of the upper core outer portion 42*b*2 and the upper end of the lower core outer portion 42*b*1, the magnetic flux flows mainly between the fixing core 721 and the upper core outer portion 42*b*2 at the initial stage of the lifting of the armature 42. Then, when the armature 42 is further lifted so that the upper end of the lower core outer portion 42*b*1 approaches the fixing core 721, that is, when the armature 42 reaches a certain height and the lower core outer portion 42*b*1 is closer to the fixing core 721 than the upper core outer portion 42*b*2, the magnetic flux is rapidly increased in correspondence with the inner diameter difference between the lower core outer portion 42*b*1 and the upper core outer portion 42*b*2 formed by the core connecting portion 425.

Therefore, after the armature 42 reaches the certain height, the magnetic force acting between the fixing core 721 and the lower core outer portion 42*b*1 is rapidly increased to increase the lifting force acting on the armature 42. In the state in which the armature 42 is lifted to the disconnection position, the lower end of the fixing core 721 may be positioned in an area surrounded by the lower core outer portion 42*b*1.

Figure 17:
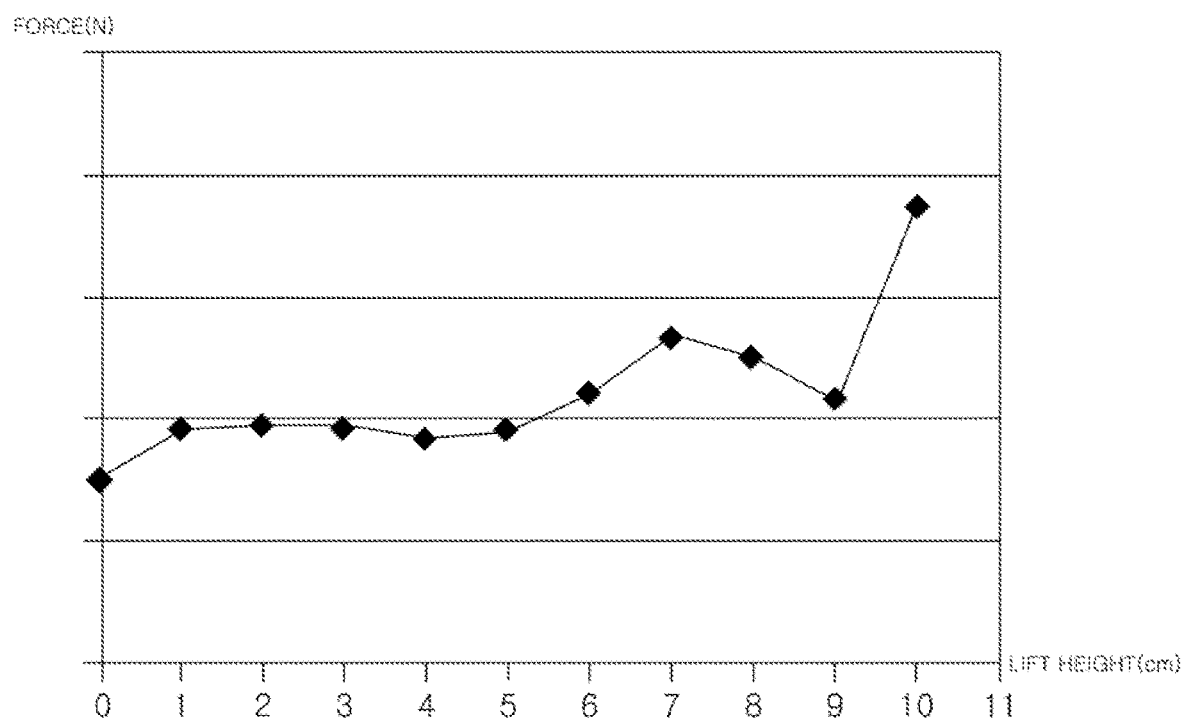
FIG. 17 is a graph showing a lifting force according to the lift height of the clutch in the washing machine shown in FIG. 14.

According to an experiment, as shown in FIG. 17, the lifting force is maximized at the lift height of 7 mm of the armature 42, at which the upper end of the lower core outer portion 42*b*1 reaches substantially the same position as the lower end of the fixing core 721, and then falls again for a certain period as the armature 42 is lifted gradually to 9 mm. In particular, by appropriately setting the inner diameter difference between the upper core outer portion 42*b*2 and the lower core outer portion 42*b*1, a desired lifting force can be achieved at a specific lift height (7 mm in the embodiment).

However, even in the case of the present embodiment, although the lifting force is rapidly increased at the lift height of 7 mm, the increase value of lifting force at the time when the lift position is changed from 6 mm to 7 mm is less than approximately 1 N. That is, the lifting force acting on the clutch 40 also shows a drastic fluctuation locally in a section in which the inner diameter of the core outer portion 42*b* is drastically changed. However, even in this case, the change of the lifting force in the entire section in which the clutch 40 is lifted shows a similar trend to that of graph (a) shown in FIG. 16.

As described above, the washing machine according to the present disclosure has several effects.

The magnetic force acting on the clutch in the process of lifting the clutch becomes uniform in comparison with the related art.

By reducing the excess force that is unnecessary for lifting the clutch, the impact when the clutch collides with the fixing core in the lifting process can be reduced, and also the noise due to the collision can be reduced.

A larger lifting force can be obtained at the initial stage of the lifting of the clutch in comparison with the related art.

The magnetic flux contributing to the lifting of the clutch can be used more efficiently in comparison with the related art.

The bearing housing for accommodating the bearing supporting the dehydration shaft constitutes a magnetic path through which the magnetic flux generated from the solenoid passes, thereby not requiring the conventional fixing core for constituting the magnetic path, simplifying the configuration of the product, and lowering the manufacturing cost.

A separate component that is used to install the conventional solenoid can be eliminated by disposing the solenoid inside the bearing housing.

The lifting operation of the armature can be accomplished smoothly, by utilizing the conventional magnetic flux flowing from the armature to the dehydration shaft to lift the armature.

When attempting to apply the lifting force to the armature at a conventional level, the power supplied to the solenoid can be reduced in comparison with the related art.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims. Accordingly, the scope of the present disclosure is not construed as being limited to the described embodiments but is defined by the appended claims as well as equivalents thereto.

What is claimed is:

1. A washing machine, comprising:
   a washing tub provided to accommodate laundry therein;
   a pulsator rotatably disposed in the washing tub;
   a dehydration shaft configured to rotate the washing tub, the dehydration shaft having a hollow portion therein;
   a drive shaft passing through the hollow portion of the dehydration shaft, the drive shaft configured to rotate the pulsator;
   a clutch configured to selectively transmit rotation of the drive shaft to the dehydration shaft;
   a solenoid configured to generate a magnetic field when a current is applied to the solenoid; and
   a fixing core located alongside the solenoid,
   wherein the clutch comprises:
      a clutch coupler movable along the dehydration shaft between a first position and a second positon elevated above the first position, the clutch coupler connecting the dehydration shaft to the drive shaft when the clutch coupler is in the first positon, and the clutch coupler disconnecting the dehydration shaft from the drive shaft when the clutch coupler is in the second positon; and
      an armature fixed to the clutch coupler, the armature being movable by the solenoid to thereby move the clutch coupler from the first position to the second position,
   wherein the solenoid is radially spaced apart from the dehydration shaft,
   wherein a first portion of the armature is placed between the solenoid and the dehydration shaft when the clutch coupler is in the second position, and
   wherein a second portion of the armature extends radially outwardly from the first portion of the armature.

2. The washing machine of claim 1, wherein the second portion of the armature comprises a core base located below the fixing core, the core base extending outwardly of the clutch coupler, the core base including an opening through which the dehydration shaft passes,
   wherein the first portion of the armature comprises a core inner portion extending upward from the core base at the opening, and
   wherein the armature further comprises a core outer portion extending upward from an outer periphery of the core base.

3. The washing machine of claim 2, wherein the core inner portion is disposed radially inward of the solenoid when the clutch coupler is in the second position.

4. The washing machine of claim 2, wherein a portion of the solenoid is disposed between the core outer portion and the core inner portion when the clutch coupler is in the second position.

5. The washing machine of claim 2, wherein the core outer portion has a truncated cone shape such that an uppermost portion of the core outer portion has a diameter larger than a diameter of a lowermost portion of the core outer portion.

6. The washing machine of claim 2, wherein the core inner portion is spaced apart from the solenoid when the clutch coupler is in the second position.

7. The washing machine of claim 2, wherein the core outer portion is spaced apart from the solenoid when the clutch coupler is in the second position.

8. The washing machine of claim 2, wherein an uppermost end of the core inner portion is lower than an uppermost end of the core outer portion.

9. The washing machine of claim 2, wherein a lower end of the fixing core is positioned in an area surrounded by the core outer portion when the clutch coupler is in the second position.

10. The washing machine of claim 2, further comprising:
    a bearing configured to rotatably support the dehydration shaft, the bearing being located at an upper side of the solenoid; and
    a bearing housing configured to receive the bearing and the solenoid therein,
    wherein a portion of the bearing housing comprises the fixing core.

11. The washing machine of claim 1, wherein a portion of the clutch coupler is located between the first portion of the armature and the solenoid when the clutch coupler is in the second position.

12. The washing machine of claim 1, wherein a lower surface of the second portion of the armature is substantially flat.

13. The washing machine of claim 1, further comprising an elastic member configured to apply a biasing force to the clutch in a direction biasing the clutch coupler toward the first positon.

14. The washing machine of claim 13, further comprising a bearing configured to rotatably support the dehydration shaft, the bearing being located at an upper side of the solenoid,
    wherein the solenoid comprises:
      a bobbin through which the dehydration shaft passes; and
      a coil wound around the bobbin, and
    wherein the elastic member is a coil spring disposed between the bearing and the clutch coupler.

15. The washing machine of claim 1, further comprising:
    a motor having a rotor; and
    a rotor hub connecting the rotor to the drive shaft, wherein the clutch coupler is engaged with the rotor hub in the first position and separated from the rotor hub in the second position.

16. A washing machine, comprising:
a cabinet;
an outer tub located in the cabinet, the outer tub being provided to accommodate wash water therein;
an inner tub located in the outer tub, the inner tub being provided to accommodate laundry therein;
an outer shaft configured to rotate the inner tub, the outer shaft having a hollow portion therein;
a pulsator rotatably disposed in the inner tub;
an inner shaft passing through the hollow portion of the outer shaft, the inner shaft configured to rotate the pulsator;
a clutch configured to selectively transmit rotation of the inner shaft to the outer shaft;
a solenoid configured to generate a magnetic field when a current is applied to the solenoid, the solenoid being radially spaced apart from the outer shaft;
a bearing configured to rotatably support the outer shaft, the bearing being located at an upper side of the solenoid; and
a bearing housing configured to receive the bearing and the solenoid therein, the bearing housing including a fixing core located alongside the solenoid,
wherein the clutch comprises:
a clutch coupler movable along the outer shaft between a first position and a second positon elevated above the first position, the clutch coupler connecting the outer shaft to the inner shaft when the clutch coupler is in the first positon, and the clutch coupler disconnecting the outer shaft from the inner shaft when the clutch coupler is in the second positon; and
an armature fixed to the clutch coupler, the armature being movable by the solenoid to thereby move the clutch coupler from the first position to the second position, the armature comprising:
a core inner portion located between the solenoid and the outer shaft when the clutch coupler is in the second position; and
a core base extending radially outwardly from the core inner portion.

17. The washing machine of claim 16, wherein the armature further comprises a core outer portion extending upward from an outer periphery of the core base, and
wherein a portion of the solenoid is disposed between the core outer portion and the core inner portion when the clutch coupler is in the second position.

18. The washing machine of claim 17, wherein an uppermost end of the core inner portion is lower than an uppermost end of the core outer portion.

19. A washing machine, comprising:
a cabinet;
an outer tub located in the cabinet, the outer tub being provided to accommodate wash water therein;
an inner tub located in the outer tub, the inner tub being provided to accommodate laundry therein;
an outer shaft configured to rotate the inner tub, the outer shaft having a hollow portion therein;
a pulsator rotatably disposed in the inner tub;
an inner shaft passing through the hollow portion of the outer shaft, the inner shaft configured to rotate the pulsator;
a motor having a rotor;
a rotor hub connecting the rotor to the inner shaft;
a clutch configured to selectively transmit rotation of the inner shaft to the outer shaft; and
a solenoid configured to generate a magnetic field when a current is applied to the solenoid, the solenoid being radially spaced apart from the outer shaft,
wherein the clutch comprises:
a clutch coupler movable along the outer shaft between a first position and a second positon elevated above the first position, the clutch coupler being engaged with the rotor hub to connect the outer shaft to the inner shaft when the clutch coupler is in the first positon, and the clutch coupler being separated from the rotor hub to disconnect the outer shaft from the inner shaft when the clutch coupler is in the second positon; and
an armature fixed to the clutch coupler, the armature being movable by the solenoid to thereby move the clutch coupler from the first position to the second position, the armature comprising:
a core inner portion; and
a core base extending radially outwardly from the core inner portion.

20. The washing machine of claim 19, wherein the armature further comprises a core outer portion extending upward from an outer periphery of the core base,
wherein an uppermost end of the core inner portion is lower than an uppermost end of the core outer portion, and
wherein a portion of the solenoid is disposed between the core outer portion and the core inner portion when the clutch coupler is in the second position.

* * * * *